June 24, 1941.   H. KREIDEL   2,247,242
NIPPLE WITH COUPLING HEAD FOR HIGH PRESSURE LUBRICANT DEVICES
Filed July 1, 1939
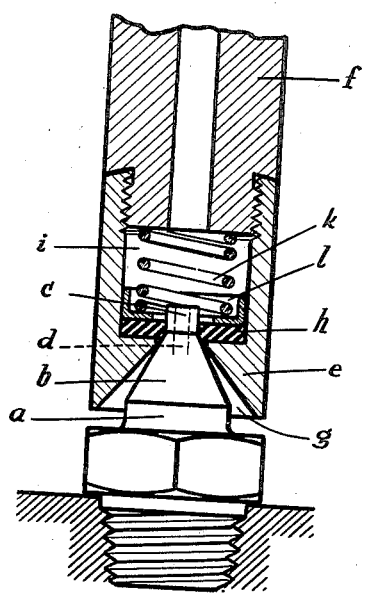
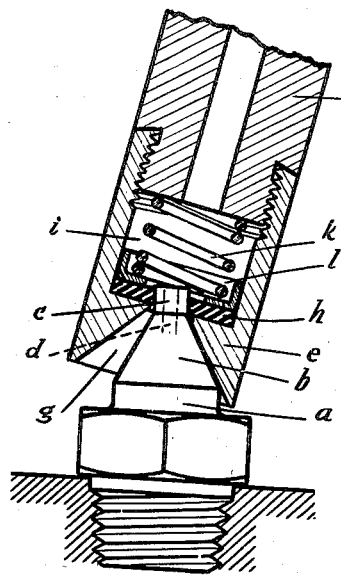
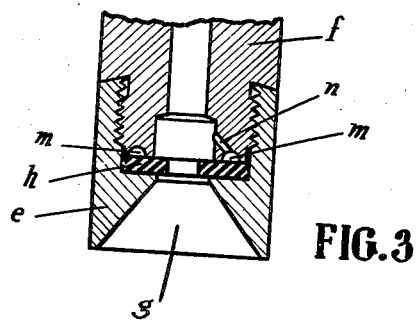
INVENTOR
HANS KREIDEL
BY
ATTORNEYS Patented June 24, 1941

2,247,242

UNITED STATES PATENT OFFICE 2,247,242

NIPPLE WITH COUPLING HEAD FOR HIGH PRESSURE LUBRICANT DEVICES

Hans Kreidel, Wiesbaden, Germany

Application July 1, 1939, Serial No. 282,358

1 Claim. (Cl. 285—161)

My invention relates to high pressure lubricant conduits, and more especially to a connection comprising a nipple and a coupling head arranged to be placed on the nipple, a tight connection between the nipple and the coupling head being effected by a resilient packing disk making a tight fit on the head of the nipple which extends through the disk, and arranged to be compressed by the lubricant in the conduit, as described in my prior patent of the United States, 2,040,008, dated May 5, 1936, for "Coupling head."

In this connection, the nipple is equipped with a spherical head on which the coupling head is placed. This spherical head is called upon to support the thrust exerted by the coupling head and so has to be made rather strong and with a comparatively large diameter. In this manner, the head presents a considerable area to the lubricant whose pressure tends to push away the coupling head from the nipple head, and gripping means must be provided for preventing this.

It is an object of my present invention to so design a connection of the kind described that the aforesaid gripping or other mechanical means can be dispensed with, even for the highest pressures, without any risk of the coupling head being forced away from the nipple head.

To this end, I make the nipple with a body in the shape of a truncated cone, with a cylindrical head whose outside diameter is made as small as possible. The coupling head is placed on the body of the nipple which supports the thrust exerted by the coupling head and serves as a pivot when the coupling head is manipulated. A tight fit is obtained by placing on the cylindrical nipple head an annular disk of resilient material which is in the coupling head. Since in this manner the cylindrical nipple head is relieved of any appreciable stress, it can be made with quite a small outside diameter and the pressure in the conduit acts only on the narrow annular area at the inner end of the nipple head, and even with a very high pressure the thrust thus produced is unable to detach the coupling head from the nipple.

The construction of the coupling head is determined by the configuration of the nipple. In order to be able to swing the coupling head manually about the nipple within certain limits, the apex angle of the truncated nipple body is preferably made less than that of the truncated cavity in the coupling head.

In the accompanying drawing, a connection embodying my invention is illustrated by way of example.

In the drawing

Figs. 1 and 2 are axial sections showing a connection in which a spring is provided for holding the packing disk in the coupling head on its seat, in two distinct angular positions.

Fig. 3 is an axial section showing the inner end of a modified coupling head in which the said spring is dispensed with.

Referring now to the drawing, and first to Figs. 1 and 2, $a$ is a nipple for the discharge of a lubricant. The body $b$ of the nipple has the shape of a truncated cone at whose small end a cylindrical head $c$ is provided. The diameter of the nipple head $c$ is made as small as practicable, for the reason stated. A bore $d$ for the lubricant under pressure is made in the axis of the nipple $a$.

A sleeve $e$ is placed on the inner end of a hollow coupling head, or discharge pipe, $f$ which is manipulated by hand and forms part of a high pressure lubricant conduit of any desired kind. At its inner end, the sleeve $e$ has a cavity $g$ which is also shaped like a truncated cone but whose apex angle is greater than that of the nipple body $b$.

The sleeve $e$ is made so long that it defines a chamber $i$ with the inner end of the coupling head $f$ and on the bottom of this chamber, just at the small end of the cavity $g$, is placed an annular packing disk $h$ of suitable resilient material which is not attacked by the lubricant, for instance, leather, rubber, or the like. A cup washer $l$ is placed on the packing disk $h$ and a coiled spring $k$ is inserted between the washer $l$ and the inner end of the coupling head $f$. By these means, the packing disk $h$ is compressed, held down on the bottom of the chamber $i$ and forced tightly about the cylinder $c$ of the nipple $a$.

Referring now to Fig. 3, the sleeve $e$ is made shorter than in the connection illustrated in Figs. 1 and 2 so that the packing disk $h$ is held between the sleeve $e$ and the coupling head $f$, the cup washer $l$ and the spring $k$ being dispensed with. Instead, the pressure of the lubricant alone is applied to the disk $h$ by an annular groove $m$ in the end of the coupling head $f$ from which a bore $n$ extends to the bore of the head, for admitting lubricant under pressure to the groove $m$.

In operation, the funnel shaped cavity $g$ of the sleeve $e$ is always seated on the body $b$ of the nipple $a$, and the aperture of the packing disk $h$ makes a tight fit on the cylindrical nipple head $c$. Fig. 1 shows the position in which the nipple $a$ and the coupling head $f$ are axially aligned, and Fig. 2 shows one of the final positions to which the coupling head can be turned about the seat of its sleeve $e$ on the nipple body $b$.

The lubricant under pressure compresses the packing disk $h$ and tends to reduce the inside diameter of its central aperture so that the inner wall of such aperture makes a tight fit about the nipple head $c$ which holds against the highest pressures. Since the cylindrical nipple head $c$ is in contact only with the resilient and non-metallic packing disk $h$ and no forces are transmitted to it but are all absorbed by the truncated nipple body $b$ on which the sleeve $e$ is seated, as described, the outside diameter of the nipple head $c$ can be very small, and its wall can be very thin. It has been found that the outside diameter of the cylindrical nipple head $c$ may be only $\frac{3}{32}$ in., or even less, and so the thrust which tends to move the coupling head $f$ away from the nipple $a$, can be balanced by a comparatively weak pressure holding the coupling head against the nipple. In other words, even the thrust resulting from the highest pressure occurring in practice is unable to push away the coupling head $f$ if it is held against the nipple under normal pressure.

When the coupling head $f$ is swung about the point where it is seated on the nipple body $b$ with the cavity $g$ of its sleeve $e$, the packing disk $h$ is always on the cylindrical nipple head $c$. This is due to the fact that the narrow annulus where the cavity $g$ of the sleeve $e$ is seated on the nipple body $b$ in the axially aligned position, Fig. 1, is in close vicinity to the packing disk $h$, and has a diameter not much in excess of the inside diameter of the aperture in the disk.

I claim:

In a high pressure lubricant conduit, in combination, a hollow nipple comprising a body having the shape of a truncated cone, and a cylindrical head having a comparatively small outside diameter and constituting a continuation of the smaller end of said truncated cone; a hollow coupling head having a cavity for the lubricant formed therein, said cavity including an inner supporting surface, said coupling head having an outwardly diverging conical surface enclosing an open chamber communicating with said cavity, said conical surface having an angle of taper which is greater than the angle of taper of said truncated cone body, said truncated cone body being situated within said chamber and adapted to engage a portion of said conical surface, and an elastic packing disc adapted to be compressed by the pressure of the lubricant, said packing disc being carried by said inner supporting surface of the coupling head and snugly embracing said cylindrical head which extends through an opening formed in the disc into said cavity, whereby said packing disc grips said cylindrical head when the pressure of the lubricant is increased and snugly fits around said cylindrical head, irrespective of the position of the coupling head relatively to the nipple.

HANS KREIDEL.